March 22, 1966   H. T. WELLENDORF   3,241,216
METHOD OF PRODUCING SNAPPING ROLLERS FOR CORN PICKERS
Filed Aug. 27, 1963

INVENTOR
HANS T. WELLENDORF
BY Talbert Dick & Darley
ATTORNEY

United States Patent Office 3,241,216
Patented Mar. 22, 1966

3,241,216
METHOD OF PRODUCING SNAPPING ROLLERS
FOR CORN PICKERS
Hans T. Wellendorf, Schleswig, Iowa
Filed Aug. 27, 1963, Ser. No. 304,880
2 Claims. (Cl. 29—148.4)

This invention relates to snapping rollers for corn pickers and more particularly to snapping rollers that will successfully remove the corn ears from the stalks under adverse conditions and without undue shelling of the kernels from the cob ears.

Substantially all corn is now picked by mechanical power corn pickers. The first phase of operation of the mechanical picker is to remove the ears from the corn stalk. This is accomplished by a pair of rotating elongated shaft rollers which permits the stalk to pass between them, but are too close together to permit the passage of the ears. To further aid this removal of the ears from the stalks, most snapping rollers have spirally arranged peripheral flanges and snapping lugs. Usually new snapping rollers function satisfactorily if picking conditions are good, however, after the rollers have been worn slick and smooth, their efficiency is greatly reduced. Also if the picking conditions are adverse, i.e. such as heavy corn and/or dry trashy situations, even new rollers are inadequate. Some effort has been made to partially solve the problem, by increasing the height of the spiral ridge flanges or lugs of the rollers. While this may aid in the removal of the ears from the stalks, it has the objection of wasting much grain by shelling many kernels from the ears being snapped.

Therefore one of the principal objects of my invention is to provide a method of producing snapping rollers for corn pickers that will successfully remove ears of corn from the corn stalks even under adverse corn picking conditions.

A still further object of this invention is to provide a method of producing snapping rollers for corn pickers which prevents the snapping rollers from objectionably shelling kernels of corn from the ears being removed from the stalks.

Still further objects of my invention are to provide a method of producing snapping rollers for corn pickers which is economical and which provides a durable snapping roller.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

Figure 1:
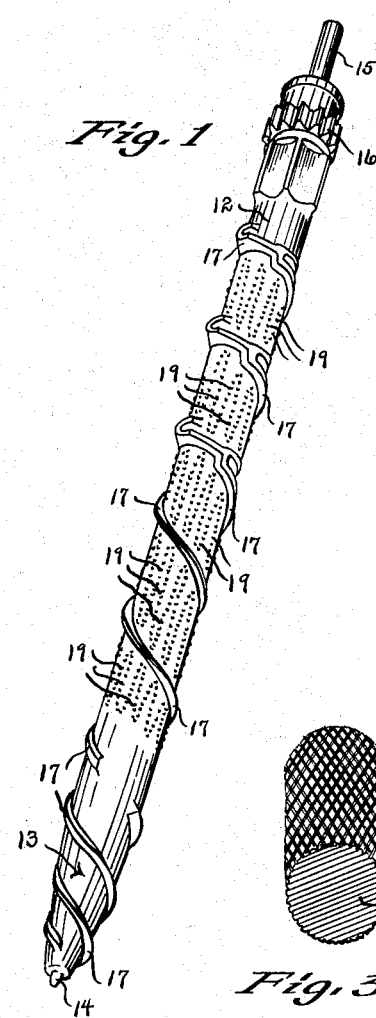
FIG. 1 is a perspective view of my ear corn snapping roller.
Figure 2:
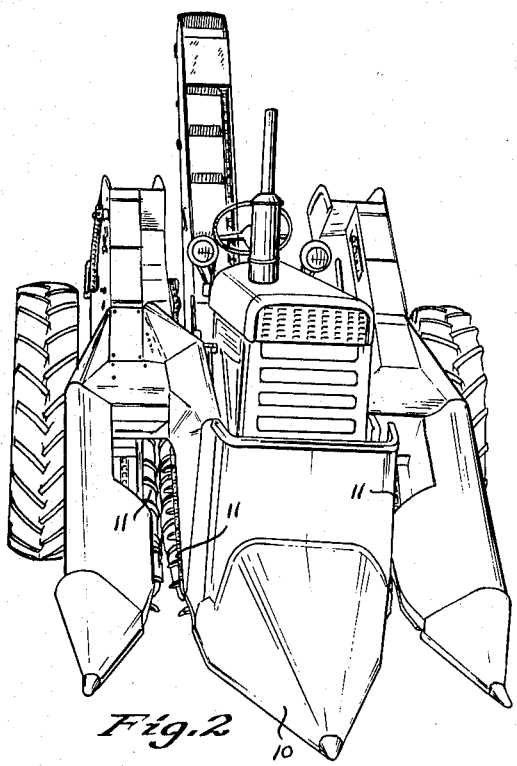
FIG. 2 is a front perspective view of a corn picker capable of using my snapping rollers.
Figure 3:
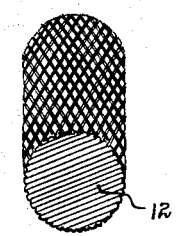
FIG. 3 is a perspective sectional view of a modified form of my snapping roller.
Figure 4:
FIG. 4 is still another perspective sectional view of a modified form of my snapping roller.
Figure 5:
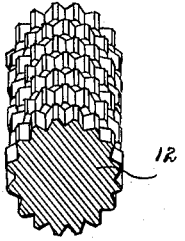
FIG. 5 is still another perspective sectional view of a modified form of my snapping roller.
Figure 6:
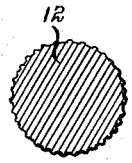
FIG. 6 is still another cross-sectional view of a modified form of my snapping roller.
Figure 7:
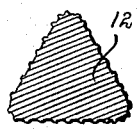
FIG. 7 is still another cross-sectional view of a modified form of my snapping roller.
Figure 8:
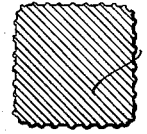
FIG. 8 is still another alternate form of structure of my snapping roller shown in cross-section.
Figure 9:
FIG. 9 is still another alternate form of structure of my snapping roller shown in cross-section.
Figure 10:
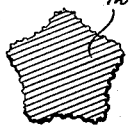
FIG. 10 is still another alternate form of structure of my snapping roller shown in cross-section.
Figure 11:
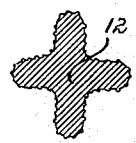
FIG. 11 is still another cross-sectional view of a modified form of structure of my snapping roller.

In these drawings, I have used the numeral 10 to generally designate a two row corn picker having the usual powered rotatably mounted snapping rolls 11. A pair of rollers is required for each row of corn being harvested and therefore the implement shown in FIG. 2 has four snapping rollers. My invention is the improvement of these snapping rollers and which I will now describe in detail. I have used the numeral 12 to generally designate my ear corn snapping roller. This roller is similar to herebefore snapping rollers in that it has its forward end area 13 tapered as it extends forwardly, it has a forward end shaft 14, it has a rear end shaft 15, it has a gear wheel 16 at its rear end portion, and it has spaced apart spiralling fins and lugs 17 around its periphery. My invention is the treatment of the peripheral face of the roller 12 between the spiralling flange ridges and above the forward tapered end area of the roller. I roughen this surface between the ridge flanges to obtain my desired results. This may be accomplished different ways, but one of the most successful methods is to use a one-eighth inch mild steel rod and a one hundred ten to one hundred twenty amp electric welder. The application is by scratching the electrode onto the surface to be roughened. This may be criss-cross or zig zag between the ridge flanges and lugs. The treatment should be rapid enough that no welding bead is formed. By mere scratching only a spray of small spheres of weld are left on the roller. It is a spray effect that imbeds itself into the roller surface and sticks thereon so tight that the roller will remain highly efficient over a long period of time. This rough surfacing of the roller provides the needed "roller traction," to successfully handle heavy corn, dry trash and like. Plugging of the rollers is eliminated as the material moves rapidly thereby keeping the rollers clean and eliminating objectionable shelling of the kernels from the ears being harvested. The spiral flange ribs and lugs should not be treated for to do so would cause them to objectionably shell kernels from the ears being harvested. If the spiral flange ribs and lugs are treated, the rollers cannot be positioned close enough together to get adequate pressure on the corn stalks. The lack of adequate pressure causes the stalks to hang between the spinning lugs which in turn beat and pound on the ears of corn causing shelling of the kernels from the ears. By keeping the ribs and lugs smooth, the ears will readily be snapped from the stalks, because the treated rollers will have traction on the corn stalks. Usually it is best to not treat the forward pointed end portion of a roller, because to do so, this end of the roller especially under wet conditions would have a tendency to wrap weeds, such as foxtail around it. Obviously, the rollers may be treated differently than that above described between the ribs and/or lugs to provide the needed frictional surface. If desired the rollers may be cast at time of manufacture with irregular peripheral surfaces between the ridge flanges. In FIG. 3 I show a grid design. The roller shown in FIG. 4 has small spaced apart domes. FIG. 5 shows a roller having teeth structure. Even the roller may have different shapes in cross-section. FIG. 6 shows a roller circular in cross-section, while FIG. 7 shows a roller triangular in cross-section. FIG. 8 shows a roller rectangular in cross-section and FIG. 9 shows a six-sided roller. FIG. 10 shows a roller star-shaped in cross-section, and FIG. 11 shows a roller with four longitudinal flanges. However, regardless of the cross-sectional structure of the roller, all have their surfaces between the ridges and/or lugs of a rough surface character.

Some changes may be made in the construction and arrangement of my snapping roller for corn pickers and method of producing same without departing from the real spirit and purpose of my invention, and it is my intention to cover by my claims, any modified forms of structure or use of mechanical equivalents which may be reasonably included within their scope.

I claim:

1. The method of treating the snapping rollers of a corn picker, comprising, the roughening of the surface of a snapping roller by the scratch welding of a spray of small spheres of weld metal which imbed and stick to irregular spaced portions of the surface between those protruding flanges of the rollers that are at a substantial distance from the forward end of the snapping roller, whereby the roller in operation is kept clean without a plugging of the roller and without objectionable shelling of the corn.

2. The method of treating the snapping rollers of a corn picker, comprising, the roughening of the surface of a snapping roller by the welding of a spray of small spheres of weld metal which imbed and stick to spaced portions of the surface between those protruding flanges of the rollers that are at a substantial distance from the forward end of the snapping roller, whereby the roller in operation is kept clean without a plugging of the roller and without objectionable shelling of the corn.

References Cited by the Examiner

UNITED STATES PATENTS

| | | |
|---|---|---|
| 901,989 | 10/1908 | Hollenbeck et al. |
| 923,806 | 6/1909 | Boda. |
| 1,670,225 | 5/1928 | Zylstra. |
| 1,810,636 | 6/1931 | Adler et al. _____ 139—307 |
| 1,830,772 | 11/1931 | Stadtherr. |
| 2,180,594 | 11/1939 | Kuhlman _____ 56—104 |
| 2,768,626 | 10/1956 | Pelowski. |
| 2,842,929 | 7/1958 | Schultz et al. |
| 3,007,231 | 11/1961 | Garver _____ 29—148.4 X |
| 3,098,285 | 7/1963 | Kelzenberg et al. ____ 29—148.4 |
| 3,156,968 | 11/1964 | White _____ 29—401 X |

WHITMORE A. WILTZ, *Primary Examiner.*

ANTONIO F. GUIDA, THOMAS H. EAGER,
*Examiners.*

J. BOLT, *Assistant Examiner.*